(12) United States Patent
Lucidarme

(10) Patent No.: US 7,418,260 B2
(45) Date of Patent: Aug. 26, 2008

(54) METHOD OF CONTROLLING A MODE OF REPORTING OF MEASUREMENTS ON A RADIO INTERFACE AND RADIO NETWORK CONTROLLER FOR THE IMPLEMENTATION OF THE METHOD

(75) Inventor: Thierry Lucidarme, Montigny le Bretonneux (FR)

(73) Assignee: Alcatel Lucent, Paris (FR)

( * ) Notice: Subject to any disclaimer, the term of this patent is extended or adjusted under 35 U.S.C. 154(b) by 681 days.

(21) Appl. No.: 10/780,403

(22) Filed: Feb. 17, 2004

(65) Prior Publication Data

US 2004/0248568 A1 Dec. 9, 2004

(30) Foreign Application Priority Data

Feb. 18, 2003 (FR) .................................. 03 01935

(51) Int. Cl.
*H04Q 7/20* (2006.01)
(52) U.S. Cl. ..................... 455/423; 455/456.1; 455/457
(58) Field of Classification Search ................. 455/423, 455/425, 456–457, 441, 437, 444, 524, 67.6, 455/67.11, 450, 517, 501, 503
See application file for complete search history.

(56) References Cited

U.S. PATENT DOCUMENTS

| | | | | |
|---|---|---|---|---|
| 5,715,516 A * | 2/1998 | Howard et al. ........... | 455/422.1 |
| 5,913,168 A * | 6/1999 | Moreau et al. ............. | 455/441 |
| 6,330,452 B1 * | 12/2001 | Fattouche et al. ......... | 455/456.1 |
| 2001/0041580 A1 * | 11/2001 | Koshino ..................... | 455/500 |
| 2002/0119757 A1 * | 8/2002 | Hamabe ...................... | 455/69 |
| 2003/0069027 A1 * | 4/2003 | Heinonen et al. .......... | 455/456 |
| 2003/0153321 A1 * | 8/2003 | Glass et al. ................ | 455/450 |
| 2003/0222819 A1 * | 12/2003 | Karr et al. ................... | 342/457 |
| 2004/0097196 A1 * | 5/2004 | Ben Rached et al. ..... | 455/67.11 |
| 2006/0025158 A1 * | 2/2006 | Leblanc et al. ........... | 455/456.2 |

FOREIGN PATENT DOCUMENTS

| | | |
|---|---|---|
| EP | 0 532 485 | 3/1993 |
| FR | 2 816 774 | 11/2000 |
| WO | WO 99/43178 | 8/1999 |
| WO | WO 01/41382 | 11/2000 |
| WO | WO 01/63960 | 8/2001 |
| WO | WO 03/005753 | 1/2003 |

OTHER PUBLICATIONS

Holtzman J M : Adaptive measurement intervals for handoffs vol. 4, Jun. 14, 1992, pp. 1032-1036, XP010061954.

(Continued)

*Primary Examiner*—Tan Trinh
(74) *Attorney, Agent, or Firm*—Sughrue Mion, PLLC

(57) ABSTRACT

Parameters of radio propagation between a mobile terminal and at least one fixed transceiver are measured. Report messages indicating at least a part of the measured parameters, in accordance with a mode of reporting specified by the radio network controller are transmitted to the radio network controller. An estimate of speed of movement of the mobile terminal is obtained at the radio network controller. The report messages are processed at the radio network controller so as to determine, by taking account of the said estimate of speed, a mode of reporting to be specified for a part at least of the report messages.

34 Claims, 10 Drawing Sheets

OTHER PUBLICATIONS

TS 25.401, "UTRAN Overall Description", version 3.1.0 published in Jan. 2000 by the 3GPP and version 4.2.0 published in Sep. 2001, section 7.2.4.8.

TS 25.301, "Radio Interface Protocol", version 3.4.0 published in Mar. 2000 by the 3GPP.

TS 25.331, "RRC Protocol Specification", version 4.1.0 published in Jun. 2001 by the 3GPP.

TS 25.433, version 4.1.0, "UTRAN Iub Interface NBAP Signalling", published in Jun. 2001 by the 3GPP.

TS 25.211 technical specification v3.3.0 "Physical channels and mapping of transport channels onto physical channels (FDD)(Release 1999)" published in Jun. 2000 by the 3GPP.

TS 25.212, "Multiplexing and channel coding (FDD)", version 3.3.0 published in Jun. 2000 by the 3GPP.

TS 25.213, "Spreading and modulation (FDD)", version 3.2.0 published in Mar. 2000 by the 3GPP.

TS 25.214, "Physical Layer Procedures (FDD)", version 3.6.0, published by the 3GPP in Mar. 2001.

TS 25.215, "Physical layer—Measurements (FDD)", version 3.3.0 published in Jun. 2000 by the 3GPP.

* cited by examiner

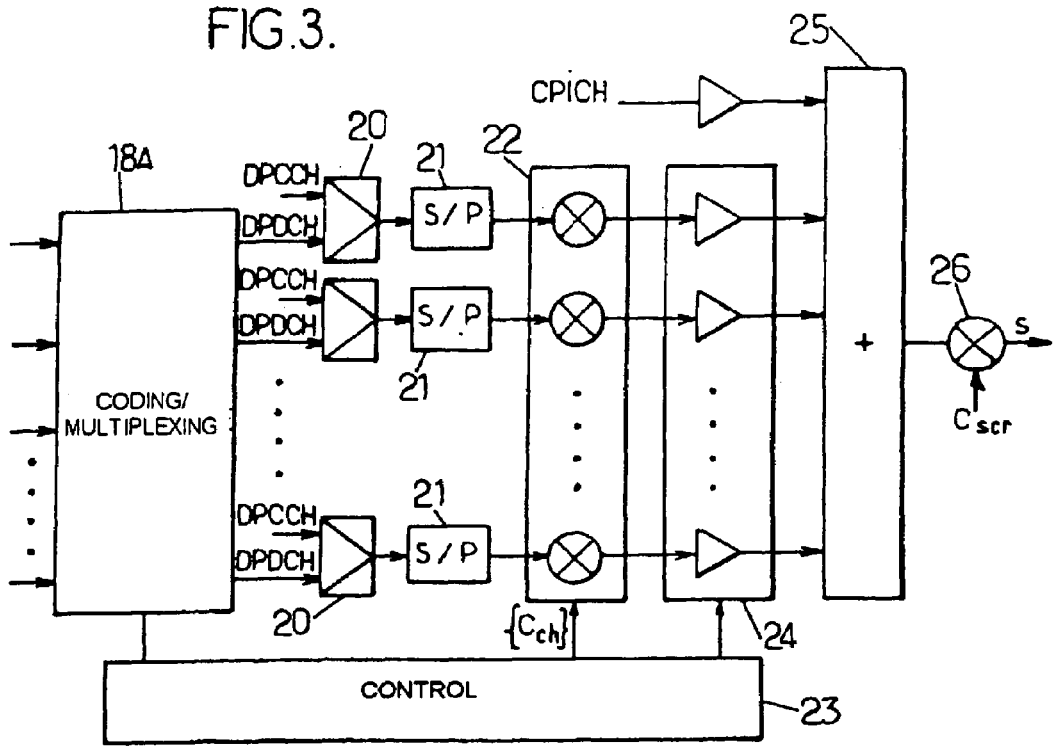
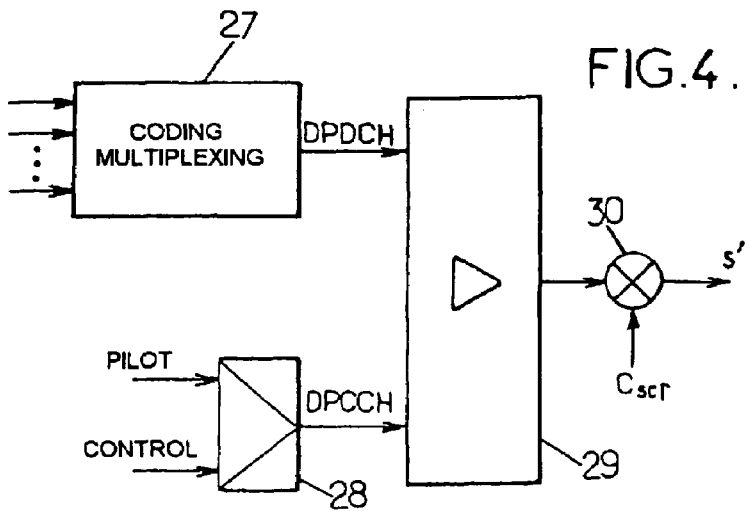

METHOD OF CONTROLLING A MODE OF REPORTING OF MEASUREMENTS ON A RADIO INTERFACE AND RADIO NETWORK CONTROLLER FOR THE IMPLEMENTATION OF THE METHOD

BACKGROUND OF THE INVENTION

The present invention relates to the measurements performed in systems for radiocommunication with mobiles.

Such measurements are usable in particular in procedures for controlling the radio links which serve in a general manner to optimize the quality of the transmissions and to minimize the interference between users. Among these procedures mention may be made of the regulating of transmission power by the mobiles and/or by the infrastructure, the control of automatic cell transfers (handovers) in cellular networks, the adaptation of the channel coding to the propagation conditions, the adaptation of the source coding (in particular the case of variable rate speech encoders of AMR "Adaptive Multi-Rate" type), the link adaptation procedures, etc.

The Efficiency of this kind of procedure depends on the availability of reliable energy measurements within as short a time span as possible, so that suitable decisions can be taken fairly quickly.

On the other hand, certain situations do not require any account to be taken of overly frequent energy measurements. In particular, when the conditions are favourable on the radio channel considered, occasional measurements may suffice in order to implement the radio links control procedures, without encumbering the signalling channels transmitting the reports of measurements performed to a control facility and without excessively invoking the processing resources of the control facility for analyses of measurements that will lead, with a small probability only, to useful changes in the management of the radio resources.

This twofold requirement has been taken into account in certain systems such as UMTS ("Universal Mobile Telecommunication System") with the possibility of defining two modes of uploading measurements from a fixed or mobile transceiver to a radio network controller, on the latter's initiative:

a periodic mode, in which reports of measurements are transmitted regularly to the network controller, with an upload period specified by the controller, between 250 ms and 64 s; and an event-based ("event-triggered") mode of reporting, where the occurrence of a specified event, detected by the terminal or by the fixed transceiver, causes the despatching of a report message to the controller.

This distinction, as well as the details of the events that may give rise to a transition between each of the two modes are described in greater detail in 3G TS 25.331 technical specifications, version 4.1.0, "RRC Protocol Specification", and 3G TS 25.433, version 41.1.0, "UTRAN Iub Interface NBAP Signalling", published in June 2001 by the 3GPP.

At present, only a limited set of events making it possible to switch over from the periodic mode to the event-based reporting mode and vice versa is envisaged. Such events are generally based on an analysis of the field level of a radio signal received. By way of example, the event designated 1F envisages the triggering of uploads of measurements, to the network controller, over a radio link, when the field level of a signal received over this link goes beyond a threshold level.

As things currently stand, the events specified for switching over from one mode of uploading measurements to the other do not comprise technical indicators for taking account of more precise criteria, this possibly leading to the maintaining of too high or too low a measurement reporting tempo in certain cases. However, a poor choice of the rate of measurement reports may have consequences possibly as extreme as a break-off in communication, for example when measurements of field level over neighbouring cells are not uploaded by a mobile terminal to the radio network controller frequently enough to allow a transfer of the communication from the serving cell to these neighbouring cells, although the quality of the communication was rapidly degrading over the current link.

An object of the present invention is to propose a finer way of achieving a compromise between uploads of measurements to a radio network controller that are frequent enough to allow better control of the radio resources, on the basis of up-to-date measurements, and a limitation of these same uploads of measurements so as to avoid an overload of signalling on the radio pathway and a monopolizing, by these measurements, of the radio network controller's processing means.

SUMMARY OF THE INVENTION

The invention thus proposes a method of controlling a mode of reporting of measurements made on a radio interface between a mobile terminal and a cellular radio network infrastructure, the infrastructure comprising at least one radio network controller and fixed transceivers. According to the invention, this method comprises the following steps:

measuring parameters of radio propagation between the mobile terminal and at least one of the fixed transceivers;

transmitting to the radio network controller report messages indicating at least a part of the measured parameters, in accordance with a mode of reporting specified by the radio network controller;

obtaining an estimate of speed of movement of the mobile terminal at the radio network controller; and processing the report messages at the radio network controller so as to determine, by taking account of the said estimate of speed, a mode of reporting to be specified for a part at least of the report messages.

In a typical embodiment, the speed estimate is calculated, at the level of the terminal and/or of a fixed transceiver, on the basis of the propagation channel parameters measured, and is included in a report message so as to be obtained at the radio network controller. It could nevertheless be obtained by other means.

The determination of the mode of reporting preferably comprises the selection between a periodic transmission of the report messages and a transmission of the report messages upon event detection. It is however conceivable to envisage a periodic mode only, with adjustment of the period taking account at least in certain cases of the estimated speed. Yet another possibility is to envisage an event-based mode only, with at least in certain cases the choice of a more or less probable event as a function of the estimated speed.

A mode of transmission with relatively frequent or probable uploads of measurements when the estimated speed of the mobile terminal is regarded as high is preferably favoured, while a mode of transmission with less frequent or less probable uploads of measurements when the estimated speed of the mobile terminal is rather more low is favoured. This mechanism has the advantage of transmitting measurements of parameters of radio channels preferably when the speed of the mobile terminal indicates that these parameters are liable to vary rapidly.

One thus avoids unnecessary uploads of measurements when the radio conditions are stable and will probably remain so owing to the low speed of the mobile. Conversely, the updating of the measurements at the radio network controller is more frequent when the radio conditions are liable to fluctuate rapidly, implying the need for an update of the radio resources.

Advantageously, a temporal variability of an energy signal over certain at least of the channels of the radio interface forms the subject of measurements. This variability or the time dependence of its value may then be taken into account, in addition to the estimated speed of the mobile terminal, in the determination of the report mode to be applied.

The invention also proposes a radio network controller for a cellular radio network infrastructure, comprising means of reception of report messages indicating radio propagation parameters measured between a mobile terminal and at least one fixed transceiver of the infrastructure, and means of processing of the report messages so as to control a mode of transmission of a part at least of the said messages in accordance with a method as defined hereinabove.

BRIEF DESCRIPTION OF THE DRAWINGS

FIG. 3 is a block diagram of the transmission part of a radio transceiver of a UMTS base station;

FIG. 4 is a block diagram of the transmission part of a UMTS mobile terminal;

DESCRIPTION OF PREFERRED EMBODIMENTS

Figure 1:
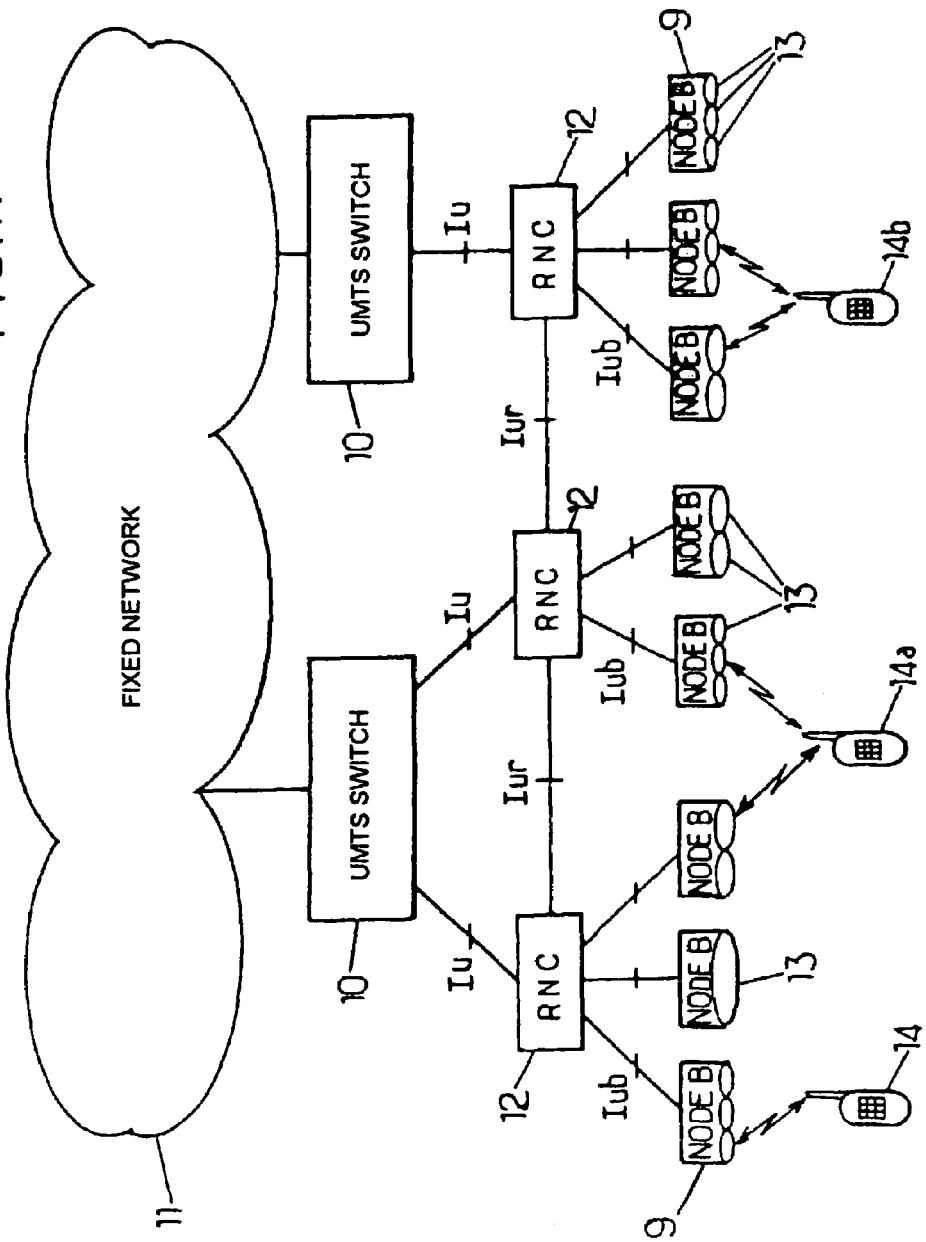
FIG. 1 is a diagram of a UMTS network.

The invention is described below in its application to a UMTS network, the architecture of which is shown in FIG. 1.

The switches of the mobile service 10, belonging to a core network (CN), are linked on the one hand to one or more fixed networks 11 and on the other hand, by means of an interface known as Iu, to control equipments 12, or radio network controllers (RNC). Each RNC 12 is linked to one or more base stations 9 by means of an interface known as Iub. The base stations 9, distributed over the network's coverage territory, are capable of communicating by radio with the mobile terminals 14, 14a, 14b called user equipment (UE). The base stations 9, also called "node B", may each serve one or more cells by means of respective transceivers 13. Certain RNCs 12 can also communicate with one another by means of an interface known as Iur. The RNCs and the base stations form an access network known as a "UMTS Terrestrial Radio Access Network" (UTRAN).

The UTRAN comprises elements of layers 1 and 2 of the ISO model in order to provide the links required on the radio interface (called Uu), and a radio resource control stage 15A (RRC) belonging to layer 3, as is described in technical specification 3G TS 25.301, "Radio Interface Protocol", version 3.4.0 published in March 2000 by the 3GPP (3rd Generation Partnership Project). Seen from the upper layers, the UTRAN simply acts as a relay between the UE and the CN.

Figure 2:
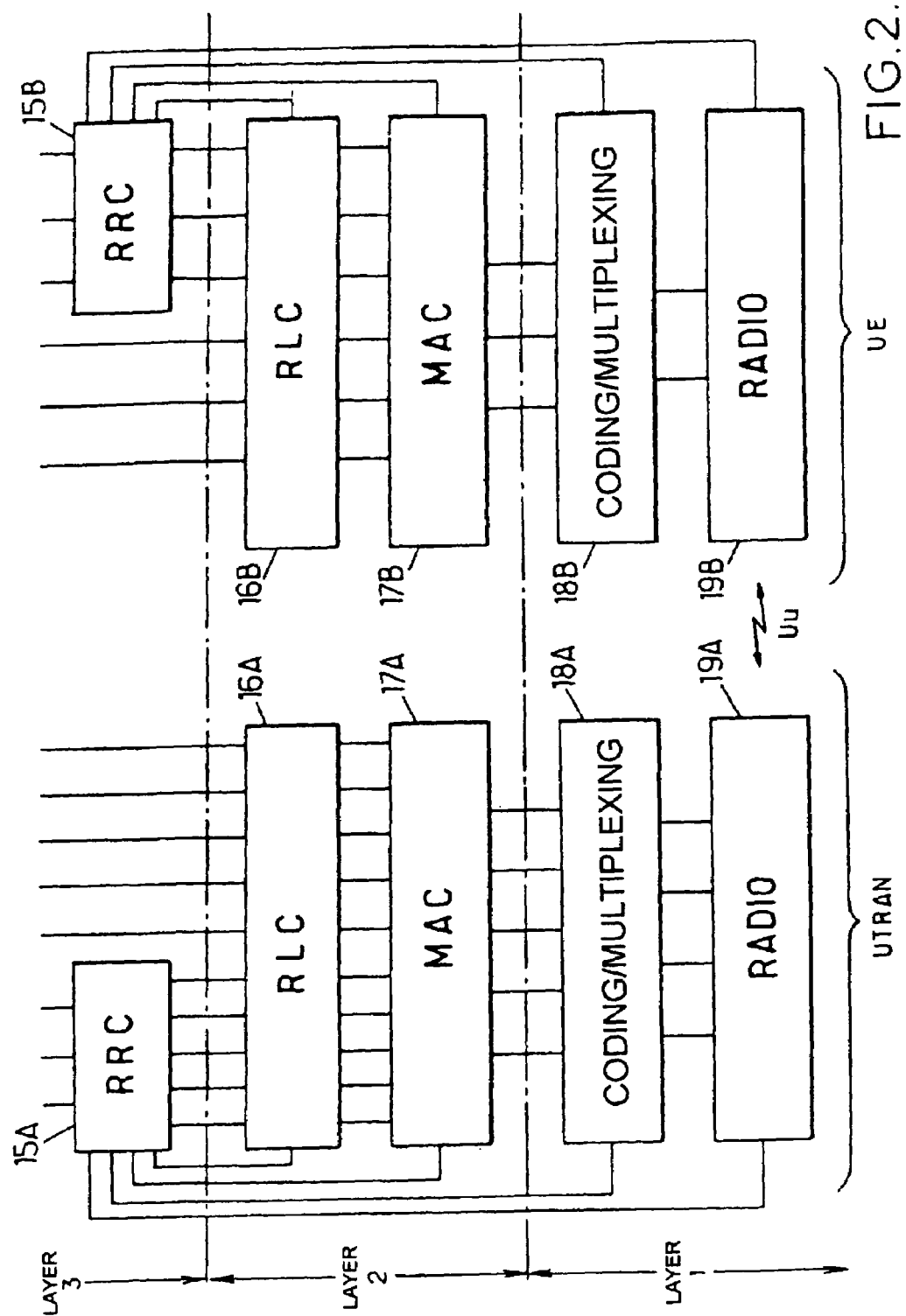
FIG. 2 is a diagram showing the organization in layers of communication protocols employed on the radio interface of the UMTS network.

FIG. 2 shows the RRC stages 15A, 15B and the stages of the lower layers which belong to the UTRAN and to a UE. On each side, layer 2 is subdivided into a stage 16A, 16B of radio link control (RLC) and a stage 17A, 17B of medium access control (MAC). Layer 1 comprises a stage 18A, 18B of encoding and multiplexing. A radio stage 19A, 19B transmits the radio signals based on streams of symbols supplied by the stage 18A, 18B, and receives the signals in the other direction.

There are different ways of adapting the architecture of protocols as shown in FIG. 2 to the hardware architecture of the UTRAN as shown in FIG. 1, and different organizations can usually be adopted to suit the types of channels (see section 11.2 of technical specification 3G TS 25.401, "UTRAN Overall Description", version 3.1.0 published in January 2000 by the 3GPP). The RRC, RLC and MAC stages are in the RNC 12. Layer 1 is for example in the node B 9. A part of this layer may however be in the RNC 12.

When several RNCs are involved in a communication with a UE, there is usually a serving RNC, called SRNC, which contains the modules pertaining to layer 2 (RLC and MAC) and at least one drift RNC, called DRNC, to which is linked a base station 9 with which the UE is in radio contact. Appropriate protocols perform the interchanges between these RNCs over the Iur interface, for example ATM ("Asynchronous Transfer Mode") and AAL2 ("ATM Adaptation Layer No. 2"). These same protocols may also be employed over the Iub interface for the interchanges between a node B and its RNC. Layers 1 and 2 are each controlled by the sublayer RRC, the features of which are described in technical specification TS 25.331, "RRC Protocol Specification", version 4.1.0 published in June 2001 by the 3GPP. The RRC stage 15A, 15B monitors the radio interface. It also processes streams to be transmitted to the remote station according to a "control plan", as opposed to the "user plan" which is for processing the user data from layer 3.

The UMTS uses the CDMA spread spectrum technique, meaning that the symbols transmitted are multiplied by spreading codes consisting of samples called "chips" the rate of which (3.84 Mchip/s in the case of the UMTS) is greater than that of the symbols transmitted. The spreading codes distinguish different physical channels (PhCH) which are superimposed on the same transmission resource consisting of a carrier frequency. The auto- and cross-correlation properties of the spreading codes allow the receiver to separate the PhCHs and to extract the symbols that are sent to it.

For the UMTS in FDD ("Frequency Division Duplex") mode, on the downlink, a scrambling code is allocated to each transceiver 13 of each base station 9 and different physical channels used by that transceiver are distinguished by mutually orthogonal channelization codes. The transceiver 13 can also use several mutually orthogonal scrambling codes, one of them being a primary scrambling code. On the uplink, the transceiver 13 uses the scrambling code to separate the transmitter UEs, and where appropriate the channelization code to separate the physical channels from one and the same UE. For each PhCH, the global spreading code is the product of the channelization code and the scrambling code. The spreading factor (equal to the ratio between the chip rate and the symbol rate) is a power of 2 lying between 4 and 512. This factor is chosen according to the symbol rate to be transmitted over the PhCH.

The various physical channels are organized into frames of 10 ms which succeed one another on the carrier frequency used. Each frame is subdivided into 15 time slots of 666 µs. Each time slot can carry the superimposed contributions of one or more physical channels, comprising common channels and dedicated physical channels (DPCH).

On the downlink, one of the common channels is a pilot channel called common pilot channel (CPICH). This channel carries a pilot signal, or marker signal, formed on the basis of a predetermined sequence of symbols (see technical specification 3G TS 25.211, "Physical channels and mapping of transport channels onto physical channels (FDD)", version 3.3.0 published in June 2000 by the 3GPP). This signal is transmitted by the transceiver 13 on the primary scrambling code of the cell, with a determined channelization code.

FIG. 3 illustrates schematically the transmission part of a fixed transceiver 13 of a UMTS base station, serving a cell by means of a scrambling code cscr. Layer 1 can multiplex several transport channels (TrCH) from the MAC sublayer onto one or more PhCHs. The module 18A receives the data streams of the downlink TrCHs, from the RNC, and applies to them the coding and multiplexing operations required to form the data part (DPDCH) of the DPCHs to be transmitted. These coding and multiplexing functions are described in detail in technical specification 3G TS 25.212, "Multiplexing and channel coding (FDD)", version 3.3.0 published in June 2000 by the 3GPP.

This data part DPDCH is multiplexed over time, within each 666 ms time slot with a control part (DPCCH) comprising control information and predetermined pilot symbols, as shown diagrammatically in FIG. 3 by the multiplexers 20 which form the bit streams of the DPCHs. On each channel, a serial/parallel converter 21 forms a complex digital signal the real part of which consists of the bits of even rank of the stream and the imaginary part of which consists of the bits of odd rank. The module 22 applies to these complex signals their respective channelization codes cCh, which are allocated by a control unit 23. The module 24 weights the resultant signals according to the respective transmission powers of the physical channels, determined by a power control process.

The complex signals of the different channels are then summed by the adder 25 before being multiplied by the scrambling code cscr of the cell by means of the module 26. The adder 25 also receives the contribution of the CPICH, which is not multiplied by a channelization code since the channelization code of the CPICH is constant and equal to 1 (technical specification 3G TS 25.213, "Spreading and modulation (FDD)", version 3.2.0 published in March 2000 by the 3GPP). The baseband complex signal s delivered by the module 26 is subjected to a shaping filter and converted to analog before modulating the carrier frequency in quadrature phase shift keying (QPSK) and being amplified and transmitted by the base station.

The different transmission resources of the transceiver 13 are allocated to the channels by the unit 23 under the control of the RRC stage 15A located in the RNC. The corresponding control messages are transmitted by means of a control application protocol of the transceivers, called NBAP ("Node B Application Protocol", see technical specification 3G TS 25.433, version 4.1.0, "UTRAN Iub Interface NBAP Signalling", published in June 2001 by the 3GPP).

FIG. 4 illustrates schematically the transmission part of a UE. It is assumed here that this UE transmits over a single physical channel. The module 27 performs the coding and where necessary the multiplexing of the corresponding TrCHs to a physical channel. This forms a real signal (DPDCH) which will be transmitted over a channel I. In parallel, control information and pilot symbols are assembled by a module 28 to form a real signal (DPCCH) which will be transmitted over a channel Q. The digital signals of channels I and Q form the real and imaginary parts of a complex signal the transmission power of which is adjusted by a module 29. The resulting signal is modulated by the spreading code of the channel comprising a scrambling code $c_{scr}$, as represented by the multiplier 30. The baseband complex signal s' thus obtained is then filtered and converted to analog before modulating the carrier frequency in QPSK.

Figure 5:
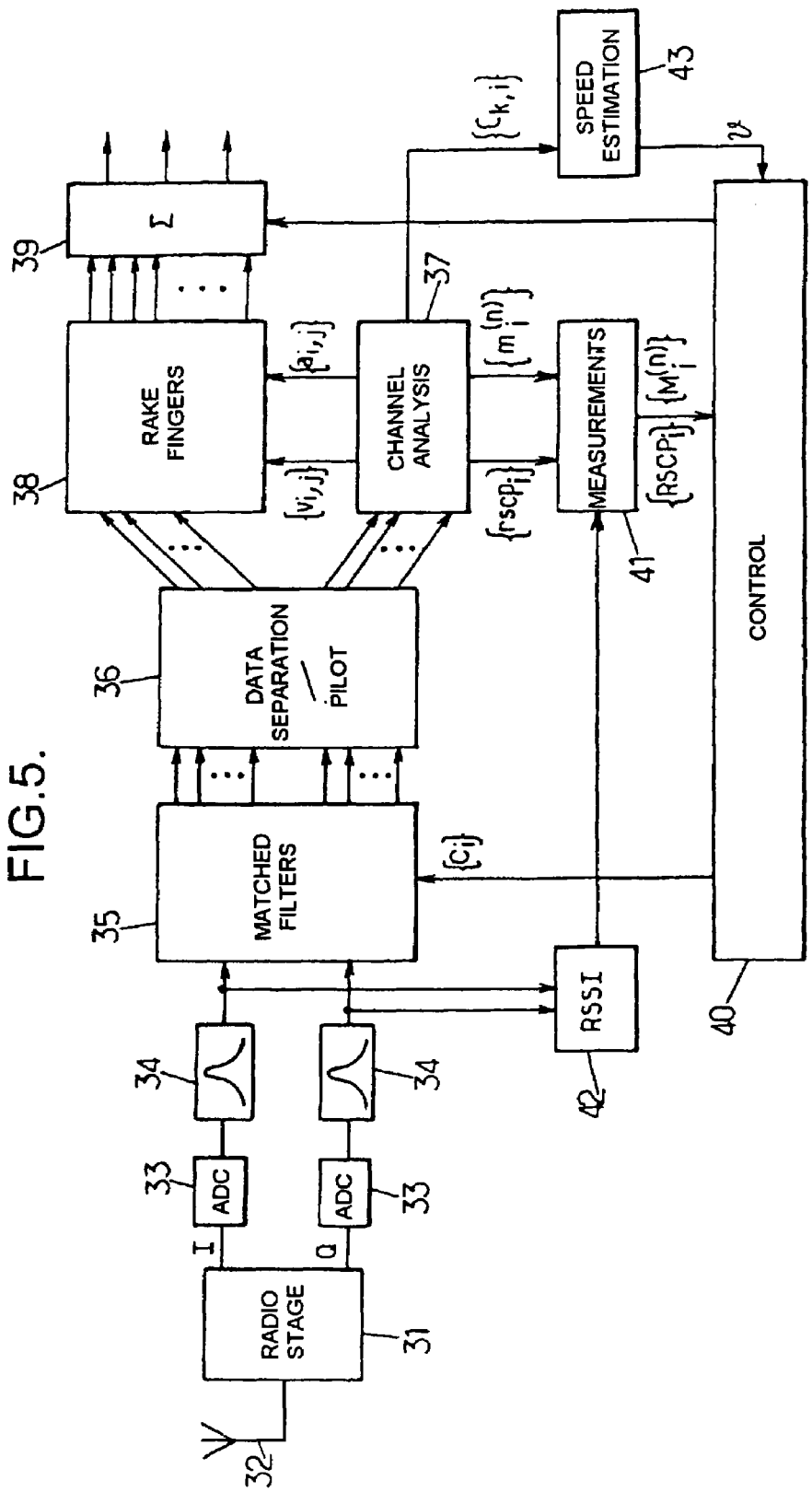
FIG. 5 is a block diagram of a receiver of a UMTS station.

FIG. 5 is a block diagram of a CDMA receiver that may be in the UE for the downlink or in the node B for the uplink. This receiver comprises a radio stage 31 which performs the analogue processing required on the radio signal captured by an antenna 32. The radio stage 31 delivers a complex analog signal the real and imaginary parts of which are digitized by the analogue-digital converters 33 on respective processing channels I and Q. On each channel, a filter 34 matched to the shaping of the pulses by the transmitter produces a digital signal at the chip rate of the spreading codes.

These digital signals are subject to a battery of matched filters 35. These filters 35 are matched to the spreading codes $c_j$ of the channels to be taken into consideration. These spreading codes $c_i$ (products of a scrambling code and where appropriate a channelization code) are supplied to the matched filters 35 by a control module 40 which manages in particular the allocation of the receiver's resources. On the node B side, the control module 40 is monitored by the RRC stage 15A of the RNC through the NBAP protocol. On the UE side, the control module 40 is monitored by the RRC stage 15B.

For N physical channels (spreading codes) taken into account, the matched filters 35 deliver N real signals on the I channel and N real signals on the Q channel, which are supplied to a module 36 for separation between the data and the pilot signals. For the downlinks, the separation consists in extracting the portions of the time slots containing the complex pilot signals transmitted by the node B to supply them to the channel analysis module 37, the corresponding data being addressed to the fingers 38 of the rake receiver. In the case of the uplinks, the separation performed by the module 36 consists in extracting the real pilot signals from the Q channel relative to each channel to supply them to the analysis module 37.

For each physical channel, denoted by an integer index i, the analysis module 37 identifies a certain number of propagation paths, denoted by an index j, on the basis of the portion of the output signal from the matched filter 35 corresponding to the pilot signals, which constitutes a sampling of the channel's impulse response.

There are various possible ways of representing the propagation paths for the rake receiver. One method consists in finding the maxima of the channel's impulse response sampled at the output of the matched filter 35, averaged over a period of some hundred milliseconds. Each propagation path is then represented by a delay $t_{ij}$ corresponding to one of the maxima, of instantaneous amplitude $a_{ij}$. In this case, the processing performed in each finger 38 of the rake receiver, allocated to path j of channel i, consists in sampling the signal received over the channel i with the delay $t_{i,j}$ and multiplying the result by $a_{i,j}^*$. The selected paths are those for which the reception energies are the highest, the reception energy following a path j of a channel i being equal to the average of $|a_{im}|^2$.

In another possible representation (see WO01/41382), each propagation path of a channel i is represented by an eigenvector $v_{ij}$ of the autocorrelation matrix of the impulse response vector supplied by the matched filter 35. In the processing performed in the finger 38 of the rake receiver, sampling with the delay $t_{ij}$ is then replaced by the scalar product of the output vector of the matched filter 35 times the eigenvector $v_{i,j}$. To estimate the eigenvectors $v_{i,j}$, the analysis module 37 performs a diagonalization of the autocorrelation matrix, which also supplies the associated eigenvalues $\lambda_{i,j}$. The eigenvalue $\lambda_{i,j}$, equal to the mathematical expectation of $|a_{i,j}|^2$, represents the reception energy of the signal on path j of channel i.

The combination module 39 of the rake receiver receives the contributions of the fingers 38 and, for each channel i, calculates the sum of the respective contributions of the retained paths j, indicated by the control module 40. The result is the local estimate of the information symbols transmitted over channel i.

In the case of a UE receiving downlink signals in macrodiversity mode, that is from several transceivers 13 using different spreading codes, the module 39 may also add up the contributions of the corresponding propagation channels to obtain the gain in diversity. The combined estimates that result from this are then submitted to the decoding and demultiplexing stage (not shown in FIG. 5).

In the case of a base station 9 receiving on several transceivers 13 uplink signals from one and the same mobile terminal in macrodiversity mode, the local estimates delivered by the respective combination modules 39 of these transceivers 13 are also combined to obtain the gain in diversity.

In the case of an uplink macrodiversity between several base stations 9 receiving signals from one and the same mobile terminal, the local estimates delivered by the respective combination modules 39 of the transceivers 13 are submitted to the decoding and demultiplexing stage (not shown in FIG. 5) to obtain the estimated symbols of the TrCH or TrCHs concerned. These symbols are transmitted to the SRNC via the Iub (Iur) interface in which they are combined to obtain the gain in diversity.

Figure 6:
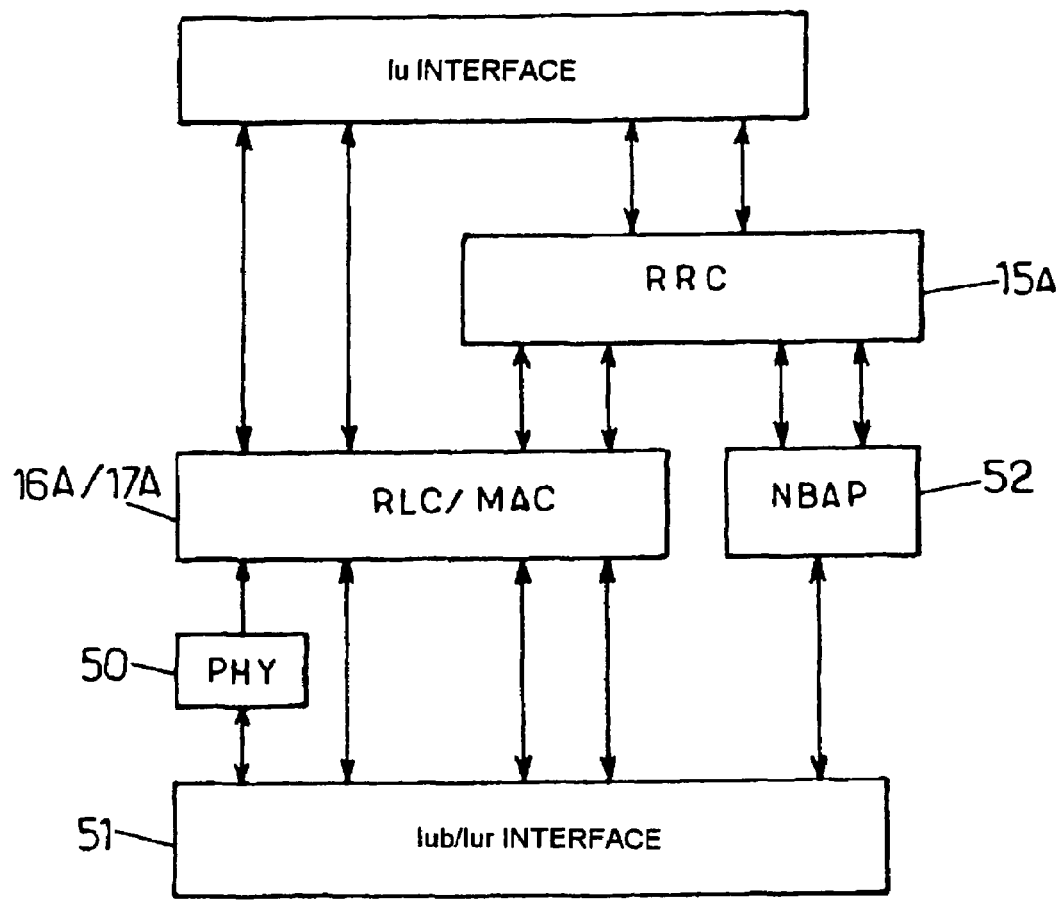
FIG. 6 is a block diagram of a UMTS radio network controller.

The corresponding combination module of the RNC 12 is designated by the reference 50 in FIG. 6. This module retrieves from the Iub and/or Iur interface 51 the symbols of the TrCH from the different base stations and supplies them the MAC stage 17A after combination. In the downlink direction, this module 50 belonging to the physical layer takes responsibility for transmitting the streams of the TrCHs from the MAC stage 17A to the base stations concerned.

FIG. 6 also illustrates schematically an instance 52 of the NBAP protocol executed at the RNC 12 to control a remote base station. The dialogue between the RRC stage 15A of the RNC and that 15B of a UE is performed by means of an "RRC connection" managed as described in section 8.1 of abovementioned technical specification *3G TS 25.331.

The procedures of the RRC protocol comprise measurement procedures described in section 8.4 of technical specification 3G TS 25.331, which serve mainly to update the active set for the UEs in macrodiversity (or SHO) as well as to adjust the transmission powers of the transceivers of the active set. The measurements expected by the RNC are requested from the UEs in "MEASUREMENT CONTROL" messages, in which are also indicated the report modes, for example with a specified periodicity or in response to certain events. The measurements specified by the RNC are then made by the UE which sends them back up on the RRC connection in "MEASUREMENT REPORT" messages (see sections 10.2.17 and 10.2.19 of technical specification 3G TS 25.331). These "MEASUREMENT CONTROL" and "MEASUREMENT REPORT" messages are relayed transparently by the transceivers 13 of the base stations.

Several non-standardized algorithms can be used by the SRNC to determine the transceivers 13 of the active set. In some cases, these algorithms for determining the active set may take into account uplink measurements, taken by the transceivers 13 of the base stations and sent back up according to the NBAP procedures described in sections 8.3.8 to 8.3.11 of the abovementioned technical specification 3G TS 25.433. The RNC tells the node B the measurements it requires in a "DEDICATED MEASUREMENT INITIATION REQUEST" message and the node B sends them back up in a "DEDICATED MEASUREMENT REPORT" message (see sections 9.1.52 and 9.1.55 of technical specification 3G TS 25.433). The modifications of the active set are reported to the UE (control module 40 of the receiver) by means of procedures for updating the active set in SHO of the RRC protocol, described in section 8.3.4 of technical specification 3G TS 25.331 ("ACTIVE SET UPDATE" message in section 10.2.1).

These modifications also give rise to the transmission of signalling from the RNC to the base stations 9 by means of procedures of establishment, addition, reconfiguration and deletion of radio links of the NBAP protocol, described in section 8 of technical specification 3G TS 25.433.

The measurements taken into consideration by the RNC to control the radio links in SHO comprise power measurements taken on the pilot channels or signals, obtained by a measurement module 41 shown in FIG. 5. Various measurements which the mobile terminals and base stations should be able to take are listed in technical specification 3G TS 25.215, "Physical layer—Measurements (FDD)", version 3.3.0 published in June 2000 by the 3GPP. The measurements obtained by the module 41 are transmitted to the RNC via the control module 40 and the RRC connection (measurement of the UE) or the NBAP protocol (measurement of the node B).

For a given channel i, the sum of the eigenvalues $\lambda_{i,j}$, determined by the analysis module 37 for the p propagation paths taken into consideration (1<j<p), represents the global energy received on the channel, reduced to the duration of a symbol. This energy is called RSCP ("Received Signal Code Power") in the standard. The analysis module 37 also determines, for each channel i, the residual noise power after taking into account the p paths. This residual power is called ISCP in the standard ("Interference Signal Code Power"). The quantity (RSCP/ISCP)×(SF/2) represents the signal-to-interferer ratio (SIR) for a downlink channel, SF designating the channel's spreading factor. The SIR equals (RSCP/ISCP)×SF for an uplink channel. In practice, a quantity of RSCP type is estimated in the physical layer of the receiver (module 37) over a duration $d_1$ of the order of about a hundred milliseconds, and the estimated value is uploaded to the RRC layer (or NBAP layer) if a corresponding parameter is requested by the RNC. In general, it is requested with a higher averaging period $d_2$, for example of the order of half a second. The values uploaded by the physical layer are therefore averaged among themselves by the module 41 to determine the measurement to be provided to the RNC. The two periods of estimation $d_1$, $d_2$ are adjustable.

The SIR, evaluated on the pilot symbols transmitted over a dedicated channel, is a measurement that the RNC may request from the UE or from the node B, and it may, where appropriate, take account of it in the management of the active set.

The radio receiver is also capable of measuring the received power in the bandwidth of the signals around a UMTS carrier. This power, measured by a module 42 upstream of the matched filters 35, is indicated by the quantity called RSSI ("Received Signal Strength Indicator").

An estimate of the speed of movement of the UE can also be made, according to various processes. According to one of them, the analysis module 37 of the radio receiver makes it possible to calculate the energy $C_{k,i}$ of a signal block received on the p propagation paths considered for channel i. This energy $C_{k,i}$, referred to the duration of a bit, is given by the sum of the squared moduli of the amplitudes $a_{i,j}$:

$$C_{k,i} = \frac{1}{N} \sum_{j=1}^{p} \beta_{k,i} \cdot |a_{i,j}|^2 \quad (1)$$

where N is the number of pilot symbols of the relevant signal block and $\beta_{k,i}$ is a weighting coefficient which takes account of the amplification or of the attenuation introduced, as the case may be, by the transmission power control procedures.

The receiver is thus furnished with an energy measurement sample C per signal block received. In the channels dedicated to the UMTS system, this block corresponds to a time interval of 2560 chips, i.e. 666 µs, and the number N may range from 2 to 16 (see sections 5.2.1 and 5.3.2 of the 3G TS 25.211 technical specification v3.3.0 "Physical channels and mapping of transport channels onto physical channels (FDD) (Release 1999)" published in June 2000 by the 3GPP ("Third Generation Partnership Project")).

On the basis of these measurement samples $C_{k,i}$, it is possible to estimate the speed V of movement of the mobile station. This estimation can take place in the mobile station on the basis of the downlink signal, or in the fixed station on the basis of the uplink signal. The speed estimation can in particular utilize the property that the variance of the first derivative of $C_{k,i}$ with respect to time is the additive inverse of the second derivative of the autocorrelation function $R_{CC}(\tau)$ of the energy $C_{k,i}$ for a time shift $\tau=0$, this second derivative itself being proportional to the square of the speed. Within the context of the Jake model and for a signal with energy a, the proportionality constant equals—

$$\left(\frac{2\pi^2 V^2}{\lambda^2}\right) \cdot a^2,$$

$\lambda$ being the radio wavelength used.

In practice, the module 43 can estimate the speed of movement V in the following manner. One is given a duration over which the speed estimation applies, expressed as a number of measurement samples m. The energy a is estimated via the average of the samples $C_{k,i}$, indexed by an integer k in equation (2):

$$a = \frac{1}{m} \sum_{k=1}^{m} C_{k,i} \quad (2)$$

The module 43 determines the derived sequence of $C_{k,i}$: $D_{1,i}, D_{2,i}, \ldots, D_{p,i}$ with $D_{k,i}=(C_{k,i}-C_{k-1,i})/T_e$, where $T_e$ is the duration between two measurement samples. The variance of this sequence is estimated by:

$$S = \frac{1}{m} \sum_{k=1}^{m} D_{k,i}^2 \quad (3)$$

The module 43 can then estimate the speed V as:

$$V = \frac{1}{\sqrt{2}} \cdot \frac{\lambda}{\pi \cdot a} \cdot \sqrt{S} \quad (4)$$

The duration $p.T_e$ is typically of the order of magnitude of a second. In practice, the arithmetic averages of relations (2) and (3) may be replaced with an exponential type smoothing with a forget factor $\alpha=1/p$.

The estimates relating to the speed are transmitted to the RNC by way of the RRC connection or of the Iub interface.

Likewise, to enable a more detailed consideration of the propagation characteristics by the algorithms for active set determination and power control for this active set, it is advantageous also to transmit to the RNC data dependent on the temporal variability of the energy level received. For this, particular value choices are provided in the "INTRA-FREQUENCY MEASUREMENT" and "MEASURED RESULTS" information elements (IE) of the abovementioned "MEASUREMENT CONTROL" and "MEASUREMENT REPORT" messages of the RRC protocol for the downlink measurements and in the "DEDICATED MEASUREMENT TYPE" and "DEDICATED MEASUREMENT VALUE" IEs of the abovementioned "DEDICATED MEASUREMENT INITIATION REQUEST" and "DEDICATED MEASUREMENT REPORT" messages of the NBAP protocol for the uplink measurements.

Moreover, the UEs in communication monitor in parallel the energies received over the CPICH channels of the cells belonging to a monitored set MS comprising the active set and a certain number of neighbouring cells. These energy measurements are usually uploaded to the RNC in the "MEASUREMENT REPORT" messages. The quantities uploaded may be the absolute energies (CPICH_RSCP) or standardized in relation to the energy of the received signal (CPICH_Ec/N0=CPICH_RSCP/RSSI). Given that the network signals the transmission powers, denoted CPICH_Tx_Power, of the nodes B to the UEs on the CPICH channels, the UE can also calculate the attenuation of the signal ("path-loss") over the propagation channel from each node B of the monitored set (PL=CPICH_Tx_Power/CPICH_RSCP). The standard provides for the RNC to be able to ask the UE to report this attenuation parameter to it (3G TS 25.331, sections 10.3.7.38 and 14.1.1).

The analysis module 37 of the receiver calculates the eigenvalues $\lambda_{i,j}=E(|a_{i,j}|^2)$ which are summed over the path index j to obtain the RSCP of canal i estimated over the duration $d_1$:

$$rscp_i = \sum_j \lambda_{i,j}.$$

It also avails itself of the instantaneous values of the complex amplitudes $a_{i,j}$ corresponding to the successive pilot symbols, and hence of the instantaneous energies $$r_i = \sum_j |a_{i,j}|^2$$

of which $rscp_i$ is the mathematical expectation estimated over the duration $d_1$. According to the invention, the module 37 furthermore estimates one or more moments of order n of the temporal distribution of the energies $r_i$, given by $m_i^{(n)} = E(r_i^n - E(r_i)^n)$. In a simple embodiment, this estimation is limited to the moment of order n=2, that is to say to the variance: $m_i^{(2)} = E(r_i^2) - rscp_i^2$.

The measurement module 41 recovers the values $rscp_i$ and $m_i^{(n)}$ and calculates the respective averages thereof over the duration $d_2$ specified by the RNC in the MEASUREMENT CONTROL message so as to obtain the measurements $RSCP_i$ (average of the $rscp_i$) and $M_i^{(n)}$ (average of the $m_i^{(n)}$) to be transmitted to the RNC 12.

In a typical embodiment, the physical channels concerned will be the CPICHs emanating from the transceivers of the monitored set MS, the measurements being uploaded by the UE in the form of pairs ($RSCP_i, V_i$) or ($PL_i, V_i$), with $V_i = M_i^{(2)}$ and $PL_i$ designating the "pathloss" calculated for cell i. It is also possible to upload one or more moments of order n>2.

The physical channels concerned may also be dedicated channels, the measurements being performed either on the UE side or on the node B side. In this case, the measurements thus made available to the RNC are limited to the cells of the active set.

Figure 7:
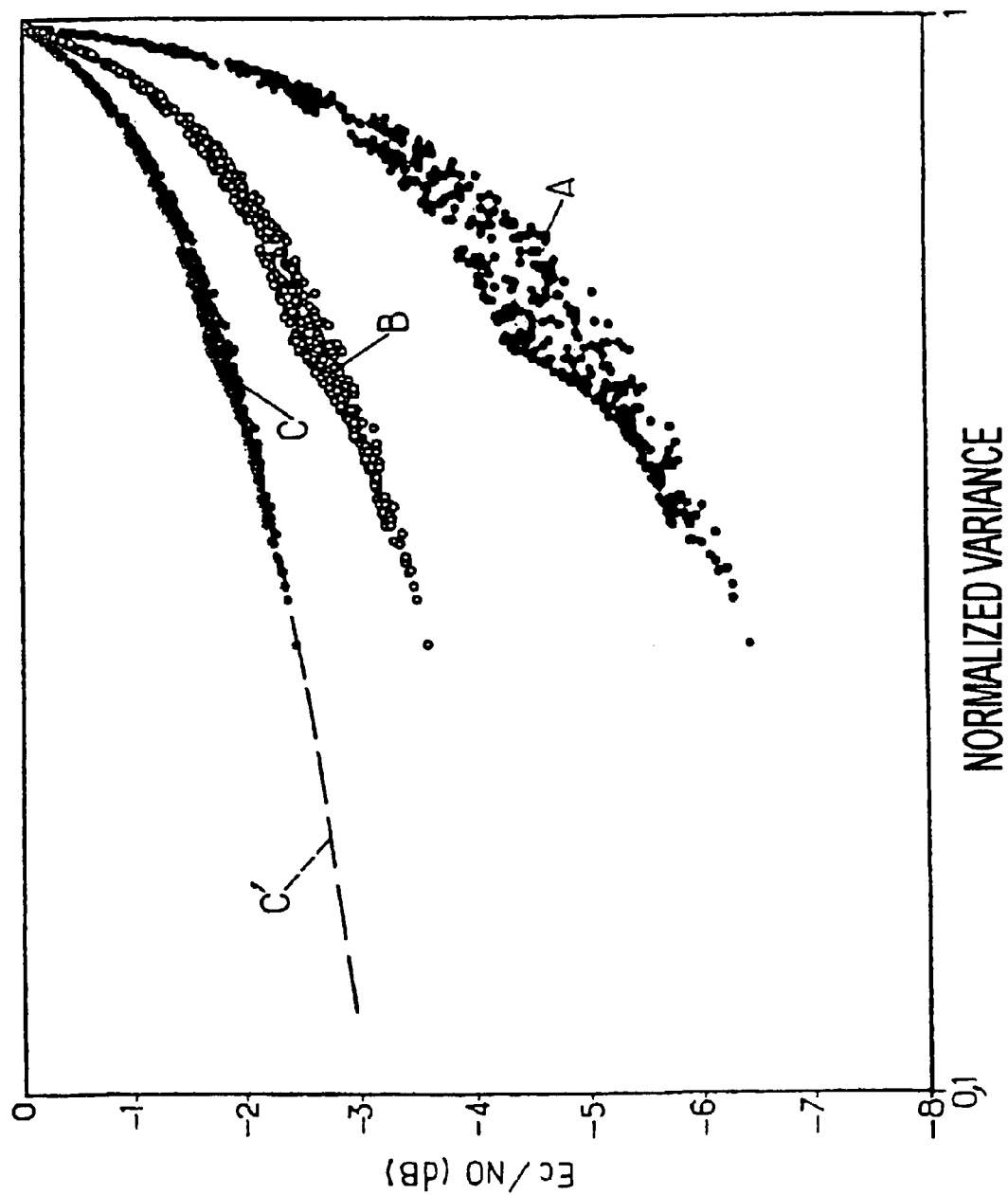
FIG. 7 is a graph usable in certain embodiments of the invention.

FIG. 7 shows results of simulations of the relation between the normalized variance $$\frac{V_i}{(RSCP_i)^2}$$

and the ratio Ec/NO (energy per chip over noise power density, expressed in dB) necessary to obtain a given binary error rate (BER) at the output of a rake receiver applying the MRC method to process the paths of propagation channel i. Each point corresponds to a simulated propagation profile, drawn randomly by varying the number of paths and their relative energies. The clusters of points A, B and C correspond respectively to BERs of 1%, 5% and 10%.

This graph reveals that for equal attenuations, it is beneficial to favour the propagation channels for which the estimated variance is low since they require a smaller Ec/NO ratio. These channels are normally those that exhibit the greatest number of decorrelated paths.

This effect can be utilized in various procedures for monitoring radio resources supervised by the RNC, in particular for the determination of the active set and the adjustment of the transmission power of the transceivers of the active set in regard to a mobile terminal.

To determine the active set, the algorithm executed at the RNC can admit as input variables the attenuations $PL_i$ and the variances $V_i$ measured by the UE for the various cells of the monitored set MS and uploaded on the RRC connection. The attenuations $PL_i$ may have been requested explicitly from the UE, or be deduced by the RNC from the $RSCP_i$ type measurements, given that the powers CPICH_Tx_Power are known to the RNC so as to be broadcast with the system information.

By way of example, the algorithm for determining the active set can consider various subsets C(k) of cells of the monitored set MS, which are candidates for constructing the active set in relation to a given UE (k=1, 2, . . . ) and keep the one which maximizes a criterion R(k) defined as follows. $PL_{min}$ denotes the lowest attenuation value (corresponding to the best gain) among the cells of the monitored set $$\left(PL_{min} = \min_{i \in MS}\{PL_i\}\right), \text{ and } D(k) = 10 \cdot \log_{10}\left(\frac{PL_{min}}{N(k) \cdot \sum_{i \in C(k)} PL_i}\right)$$

the budget (negative or zero) of the candidate set C(k) composed of N(k) cells with respect to the candidate set consisting of just the cell exhibiting the minimum attenuation value, assuming that the power transmitted is distributed uniformly between the N(k) cells. After having estimated the quantities D(k), it is possible if appropriate to eliminate certain of the candidate sets C(k), those for which these quantities fall below a specified negative threshold, for example of the order of −2 to −5 dB. For each remaining candidate C(k), a diversity gain G(k) is then estimated from the normalized variance V(k) of the sum of the contributions of the N(k) cells. In the case of a set C(k) of N(k)=2 cells of index i and j, this normalized variance is given by $$V(k) = \frac{PL_i^2 \cdot V_i + PL_j^2 \cdot V_j}{(PL_i + PL_j)^2},$$

still assuming a uniform distribution of the power transmitted between the cells. With the aid of a chart or of an empirical formula, this normalized variance V(k) is converted into a gain G(k) in terms of ratio Ec/NO (G(k)>0, expressed in dB) by referring to a specified BER value. It is usual to refer to a BER of 10%, so that an empirical formula such as this can be obtained with the aid of a parametric curve C' exhibiting a minimum distance, for example in the least squares sense, with the points C corresponding to this BER reference in a simulation of channels, such as the one illustrated by FIG. 7. The criterion R(k) to be maximized is finally evaluated by summing the quantity D(k) and the diversity gain G(k), i.e. R(k)=D(k)+G(k).

The procedures for adjusting the transmission power of the transceivers of the active set in regard to a mobile terminal are aimed at balancing the downlink power transmitted by these fixed transceivers (section 5.2 of technical specification TS 25.214, "Physical Layer Procedures (FDD)", version 3.6.0, published by the 3GPP in March 2001). The manner in which the RNC controls the nodes B so as to supply them with the balance parameters required is described in section 8.3.7 of technical specification 3G TS 25.433 cited above. The parameters "Pref", alluded to in the said section, can be tailored cell by cell to control distribution of power over the set of transceivers of the active set. Here again numerous power control strategies may appear.

By way of example, in a case where the active set (determined as indicated previously or in any other way) comprises two cells of index i and j, whose attenuation values $PL_i$ are not too far apart, in the sense that their gap is less than a specified threshold, a possibility is to apply a weighting coefficient $x_i$ given by $$x_i = \frac{PL_j \cdot V_j}{PL_i \cdot V_i + PL_j \cdot V_j}$$

to cell i and a weighting coefficient $x_j=1-x_i$, so as to favour the cell for which the variance is smallest, that is to say the one which generates the greatest diversity.

The variations in power to be employed may generally be determined empirically with the aid of simulations. One then obtains a correspondence table giving the parameters for adjusting the transmission power to be addressed to each of the transceivers, as a function of various values of attenuations and of variance for each transceiver. Once constructed, this table can be stored in the RNC 12. The latter can call upon it after analysing the measurements that are uploaded to it, so as to return to each transceiver the appropriate parameters for adjusting their transmission power.

When the measurements of variability data are performed on dedicated channels (by the nodes B or by the UEs) rather than on the CPICHs, their consideration by the transmission power of adjustment procedures may be similar to what has just been described. For the determination of the active set, these measurements are essentially utilizable to decide whether a given cell should be maintained in the active set.

As another example of using the variability measurements supplied to the RNC in accordance with the invention, mention may be made of the fixing of the initial preset for the closed loop for controlling transmission power from a UE. In a known manner (see technical specification 3GPP TS 25.401, version 4.2.0 published in September 2001, section 7.2.4.8), the transmission power of the UE is slaved up or down by TPC ("Transmit Power Control") bits inserted by the node B into each 666 μs time slot. These TPC bits are determined by the node B in a fast closed loop aimed at aligning the SIR of the signal received from the UE with a preset $SIR_{target}$ assigned to it by the RNC. This preset is determined by the RNC in a slower outer loop so as to achieve a communication quality objective, generally expressed in terms of blockwise error rate (BLER) It is desirable to fix a pertinent initial value for the preset $SIR_{target}$ so as to reduce the convergence time of the outer loop. This can be performed by taking account of the variability data measured by the mobile on the CPICH before channel setup and uploaded to the RNC: the initial $SIR_{target}$ will typically be chosen to be smaller when the measured variance is low than when it is high. This initial value is supplied to the node B in the message RADIO LINK SETUP REQUEST of the NBAP protocol (3G TS 25.433, sections 8.2.17 at 9.1.36).

The speed measurements and the variability measurements, supplied to the RNC in accordance with the invention are also utilizable within the framework of the procedures for determining the mode of transmission to the RNC of "MEASUREMENT REPORT" messages from a UE, or of "DEDICATED MEASUREMENT REPORT" messages from a node B.

The standard provides for an event-based mode of reporting and a periodic mode of reporting. In the periodic mode, several reporting periods may be defined. In the event-based mode, several trigger events may be defined.

In the RRC protocol, the periodic mode or event-based mode is specified by the "MEASUREMENT REPORTING MODE" IE of the "MEASUREMENT CONTROL" message while the period or the trigger event is specified in the "INTRAFREQUENCY MEASUREMENT" IE of this same message (3G TS 25.331, sections 10.2.17, 10.3.7.36 and 10.3.7.49). The possible periods go from 250 ms to 64 s (section 10.3.7.53). Nine families of trigger events, denoted from 1a to 1i, are provided for (section 10.3.7.39). In the NBAP protocol, the periodic mode or event-based mode is specified by the "REPORT CHARACTERISTICS" IE of the "DEDICATED MEASUREMENT INITIATION REQUEST" message, as well as the period or the trigger event (3G TS 25.433, sections 9.1.52 and 9.2.1.51). The possible periods go from 10 ms to 1 h. Six families of trigger events, denoted from A to F, are provided for (section 8.3.8.2).

An advantage of the event-based mode when the radio reception conditions are still good (the event specified does not occur) is that the Uu and Iub interfaces are not unnecessarily loaded with "MEASUREMENT REPORT" and/or "DEDICATED MEASUREMENT REPORT" messages and that the RNC does not waste its time in executing its radio resources management algorithms on the data contained in these messages. On the other hand, if there is a risk that the radio reception conditions may soon degrade, it is beneficial to favour the periodic mode, preferably with a short period.

The implementation of the invention leads to favouring the event-based reporting mode to the detriment of the periodic mode when the estimated speed of movement of the UE considered is relatively small. Within the periodic mode, it leads to favouring a measurements upload period that is small when the estimated speed of movement of the UE considered is small. Specifically, the small speed of the UE indicates that the radio conditions will not be modified very quickly and hence that overly frequent measurements are unnecessary. Conversely, the periodic reporting mode possibly with a high upload period is favoured when the speed of movement of the UE considered is relatively high.

A mode of reporting giving rise to more frequent or more probable messages will therefore be adopted when the estimated speed of the UE is high than when it is small. Within the periodic mode (which is sometimes the only one implemented), the RNC will tend to shorten the periods specified in the "MEASUREMENT CONTROL" or "DEDICATED MEASUREMENT INITIATION REQUEST" message when the measured speeds are large, and vice versa. Within the event-based mode, it is also possible to modify the monitored event, and in particular the range of values that is specified in the definition of this event, so that it becomes more probable in the presence of high speeds.

Figure 8:
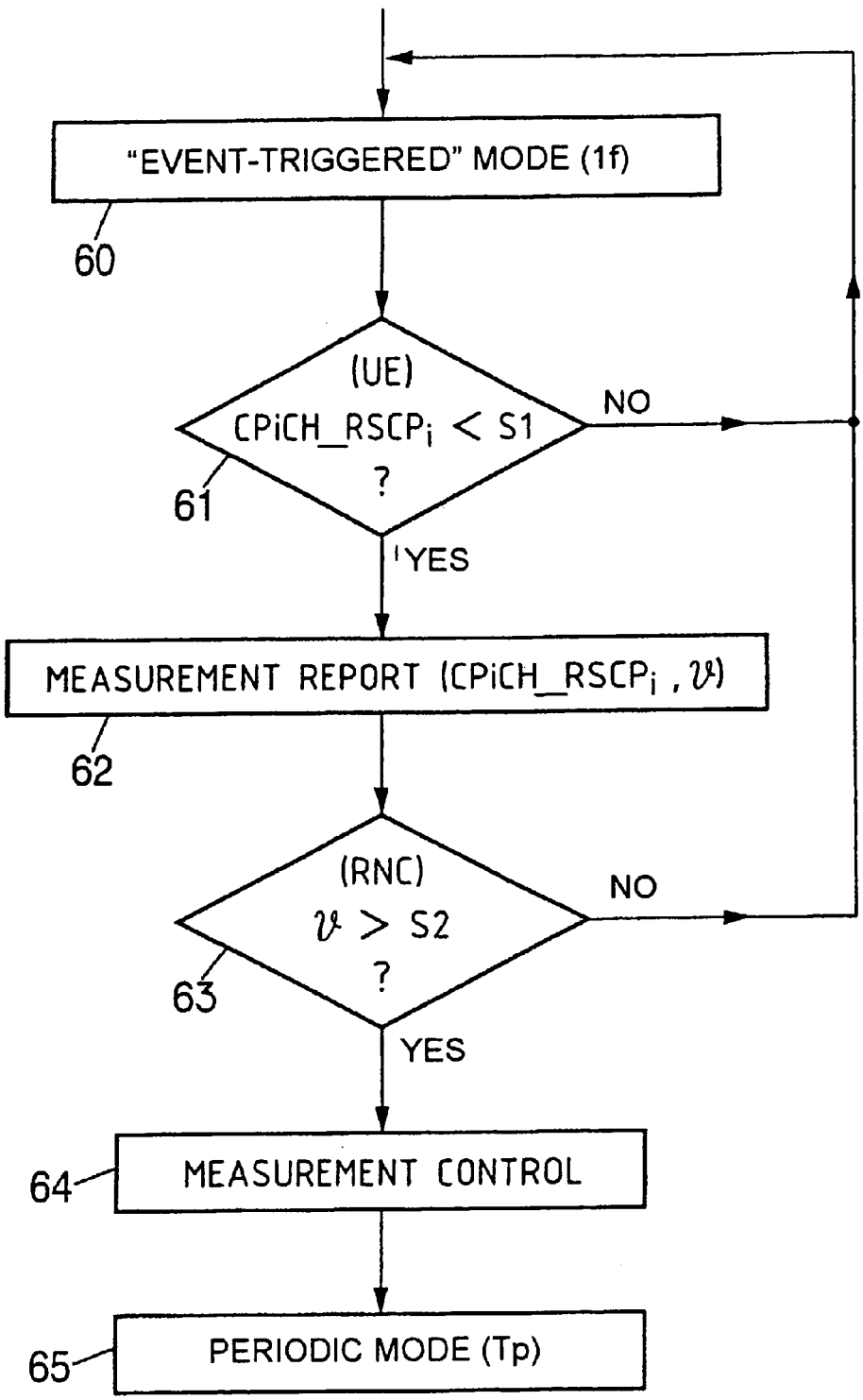
FIGS. 8 to 11 are flowcharts of exemplary procedures for controlling radio resources executed according to the invention.
Figure 9:
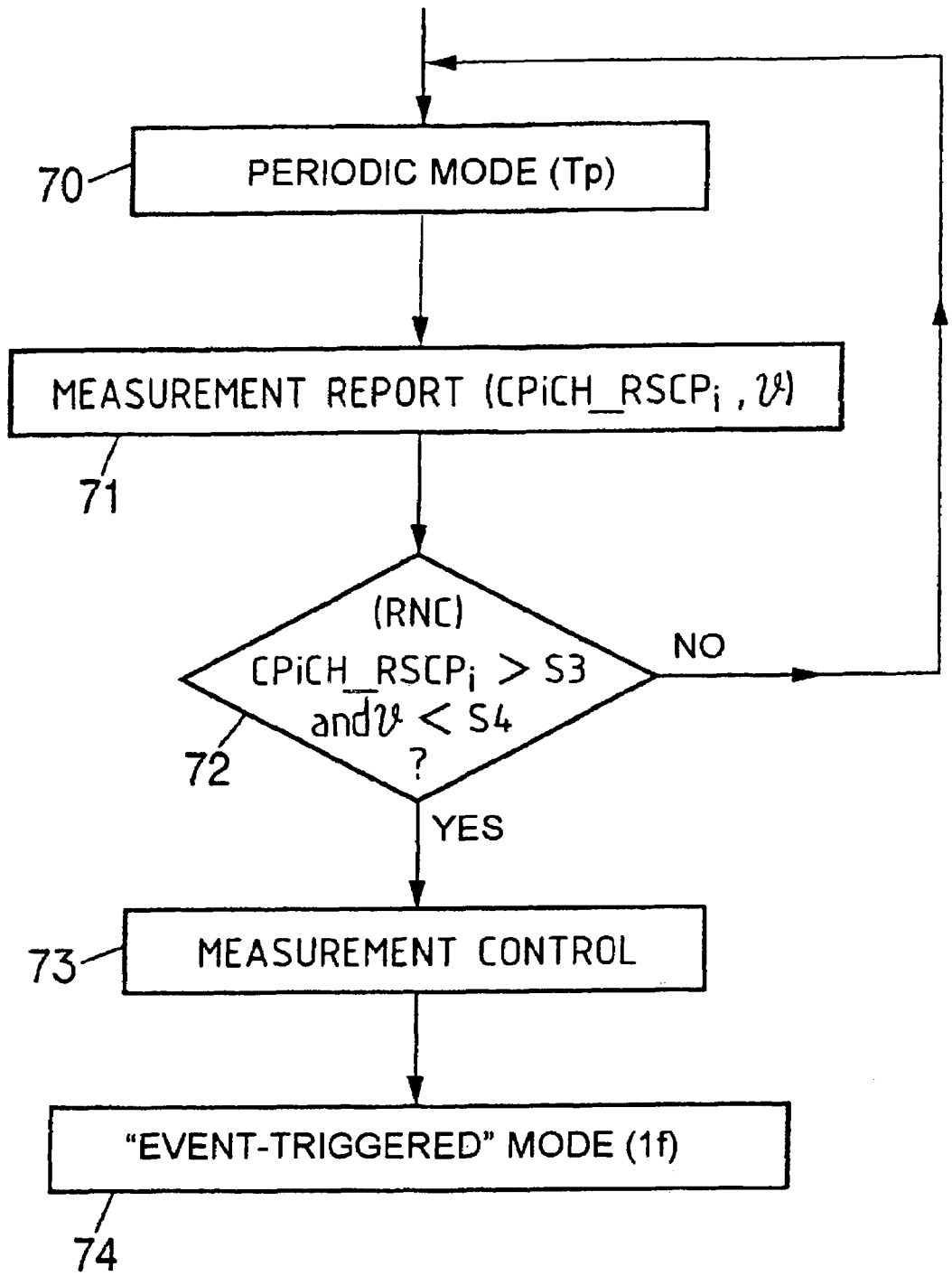

FIGS. 8 and 9 illustrate an exemplary procedure usable by the RNC 12 to specify the mode of reporting which the UE 14 will have to obey by taking account of the information afforded by the estimates of speed of the UE.

These figures refer to the RRC protocol. Similar procedures may be implemented to control the nodes B 13 with the aid of the NBAP protocol.

In the example of FIG. 8, the terminal is initially in event-based mode, and the event 1f of the standard has been specified to it (step 60). Consequently, the UE monitors the power level measurements received from its serving cell i, for example the parameter $CPICH\_RSCP_i$, comparing it with a threshold Si (step 61). As long as the level remains greater than this threshold, the UE remains in event-based mode. When the power level drops below the threshold S, the UE addresses a "MEASUREMENT REPORT" message to its RNC specifying in particular the last parameters $CPICH\_RSCP_i$ and the estimated speed V of the UE (step 62). In the analysis of these measurements, the RNC compares the speed V with another predetermined threshold S2 (step 63). If V≦S2, the RNC considers that the UE is moving slowly, so that it maintains the UE in event-based reporting mode, that is to say that it does not address any "MEASUREMENT CONTROL" message to it. On the other hand, if V>S2 in step 63, the RNC sends the UE a "MEASUREMENT CONTROL" message in step 64, so that the latter goes to periodic mode in step 65 with a relatively short reporting period Tp.

In another variant, when the speed V seems to be relatively low during test 63 (V≦S2), the RNC sends a "MEASUREMENT CONTROL" message so as to make the UE go to periodic reporting mode, but with a longer reporting period than the period Tp indicated in step 65.

The test of step 63 could on the other hand pertain in a cumulative manner to the speed V and to the signal level CPICH_RSCP$_i$ so that the event-based mode is maintained only if V>S2 and CPICH_RSCP$_i$≧S'1, the threshold S'1 being less than S1. This makes it possible to go to periodic mode when the degradation in the CPICH_RSCP$_i$ becomes too severe.

In the example of FIG. 9, the UE 14 is initially in periodic mode, with a reporting period T$_p$ (step 70). Consequently, at each period T$_p$, the UE sends the RNC a "MEASUREMENT REPORT" message in which it indicates in particular the last parameters CPICH _RSCP$_i$ and V. In the analysis of these parameters, done in step 72, the RNC examines whether the signal level CPICH_ RSCP$_i$ becomes greater than a threshold S3. If so, it will address a "MEASUREMENT CONTROL" message to the UE in order to cause to go to event-based mode (step 73) only if the UE is moving sufficiently slowly, this being expressed by the condition that the speed V is less than a threshold S4. The "MEASUREMENT CONTROL" message sent to the UE when CPICH _RSCP$_i$>S3 and V<S4 causes the UE to go to event-based mode in 74, the event 1f being for example monitored subsequently.

As a variant, this "MEASUREMENT CONTROL" message of step 73 could maintain the UE in periodic reporting mode, but with a lengthened period relative to the period Tp.

In a further refined embodiment, the implementation of the invention leads to favouring the event-based reporting mode to the detriment of the periodic mode when the estimated speed of movement of the UE is relatively small and the variability of the channel is relatively small, that is to say when the channel is relatively rich in multipaths. Specifically, the degradation of another parameter, for example the CPICH_RSCP or the CPICH_Ec/NO, may often be compensated for by the richness of the channel in multipaths, that can be evaluated from the variance information uploaded to the RNC according to the invention.

More generally, a mode of reporting giving rise to more frequent or more probable messages will be adopted when the estimated speed of the UE is relatively high and when the variability of the channel is large (or when it is currently increasing) than when it is small (or when it is currently decreasing). Within the periodic mode (which is sometimes the only one implemented), the RNC will tend to shorten the periods specified in the "MEASUREMENT CONTROL" or "DEDICATED MEASUREMENT INITIATION REQUEST" message when the speed of the UE is relatively high and the measured variances are large or increasing, and vice versa. With the event-based mode, it is also possible to modify the monitored event, and in particular the range of values that is specified in the definition of this event, so that it becomes more probable in the presence of large or increasing variances.

Figure 10:
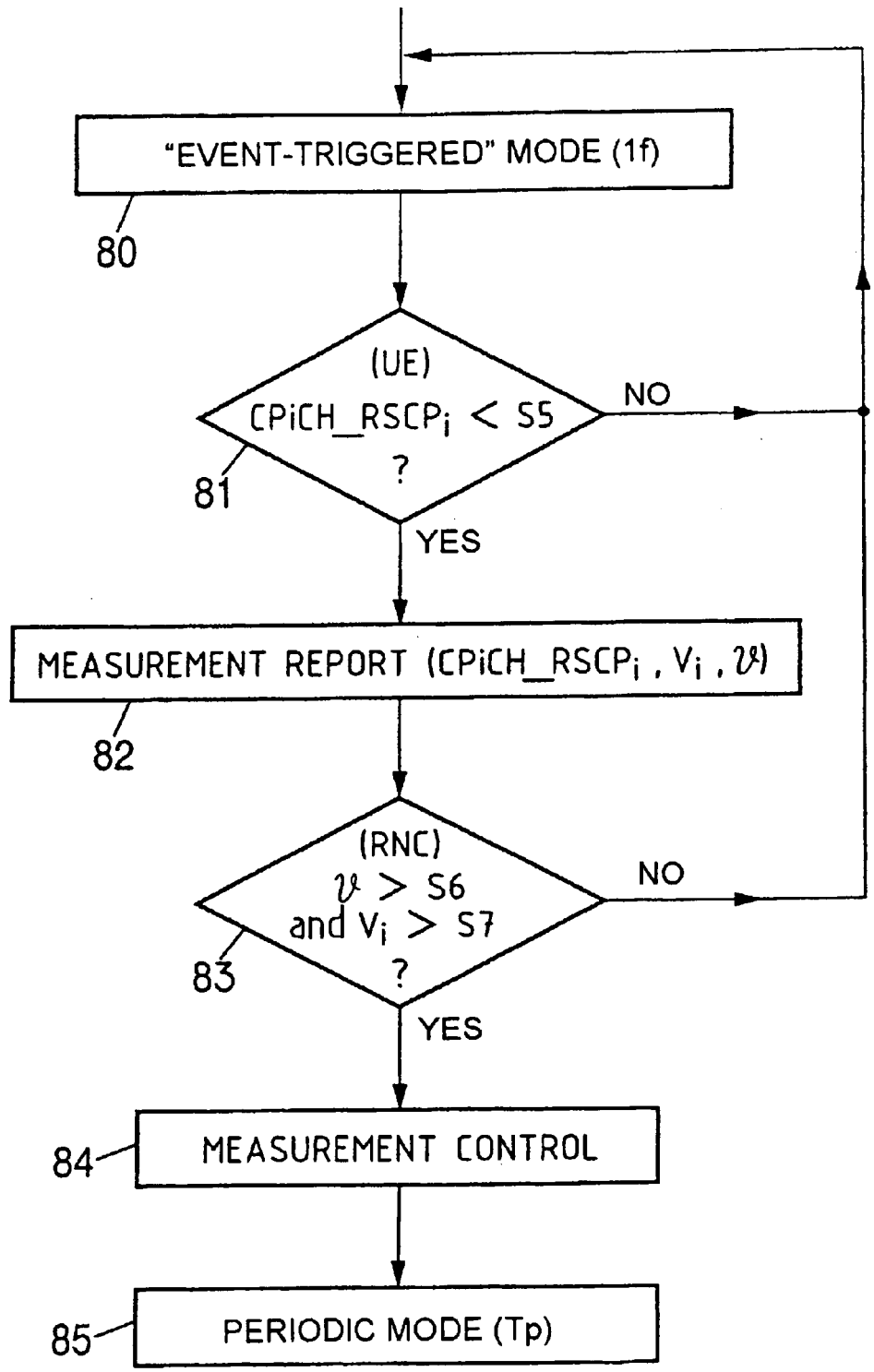

In the example of FIG. 10, the terminal is initially in event-based mode, and the event 1f of the standard has been specified to it (step 80). Consequently, the UE monitors the power level measurements received from its serving cell i, for example the parameter CPICH_RSCP$_i$, comparing it with a threshold S1 (step 81). As long as the level remains above this threshold, the UE remains in the event-based mode. When the power level drops below the threshold S5, the UE addresses a "MEASUREMENT REPORT" message to its RNC specifying in particular the last parameters CPICH_RSCP$_i$, the estimated speed V and the normalized variance V$_i$ (step 82). In the analysis of these measurements, the RNC compares the speed V with a threshold S6 and the variance V$_i$ with another threshold S7 chosen inversely proportional to the order of the path diversity desired in cell i (step 83). If V≦S6 or V$_i$≦S7, the RNC considers respectively that the UE is moving sufficiently slowly or that a channel that is relatively rich in multipaths is present, so that it maintains the UE in event-based reporting mode, that is to say it does not address any "MEASUREMENT CONTROL" message to it. On the other hand, if V>S6 or V$_i$>S7 in step 83, the RNC sends the UE a "MEASUREMENT CONTROL" message in step 84, so that the latter goes to periodic mode in step 85 with a relatively short reporting period T$_p$.

Numerous variance may be adopted in the exemplary embodiment of FIG. 10. In one of them, the test 83 does not consist in comparing the normalized variance V$_i$ with a threshold S7, but in determining whether this variance received in the last "MEASUREMENT REPORT" message is larger than that received in the previous message for the same UE and the same cell. The "MEASUREMENT CONTROL" message is then sent to step 84 only if the speed V is sufficiently great and if the variance V$_i$ is currently getting bigger.

Figure 11:
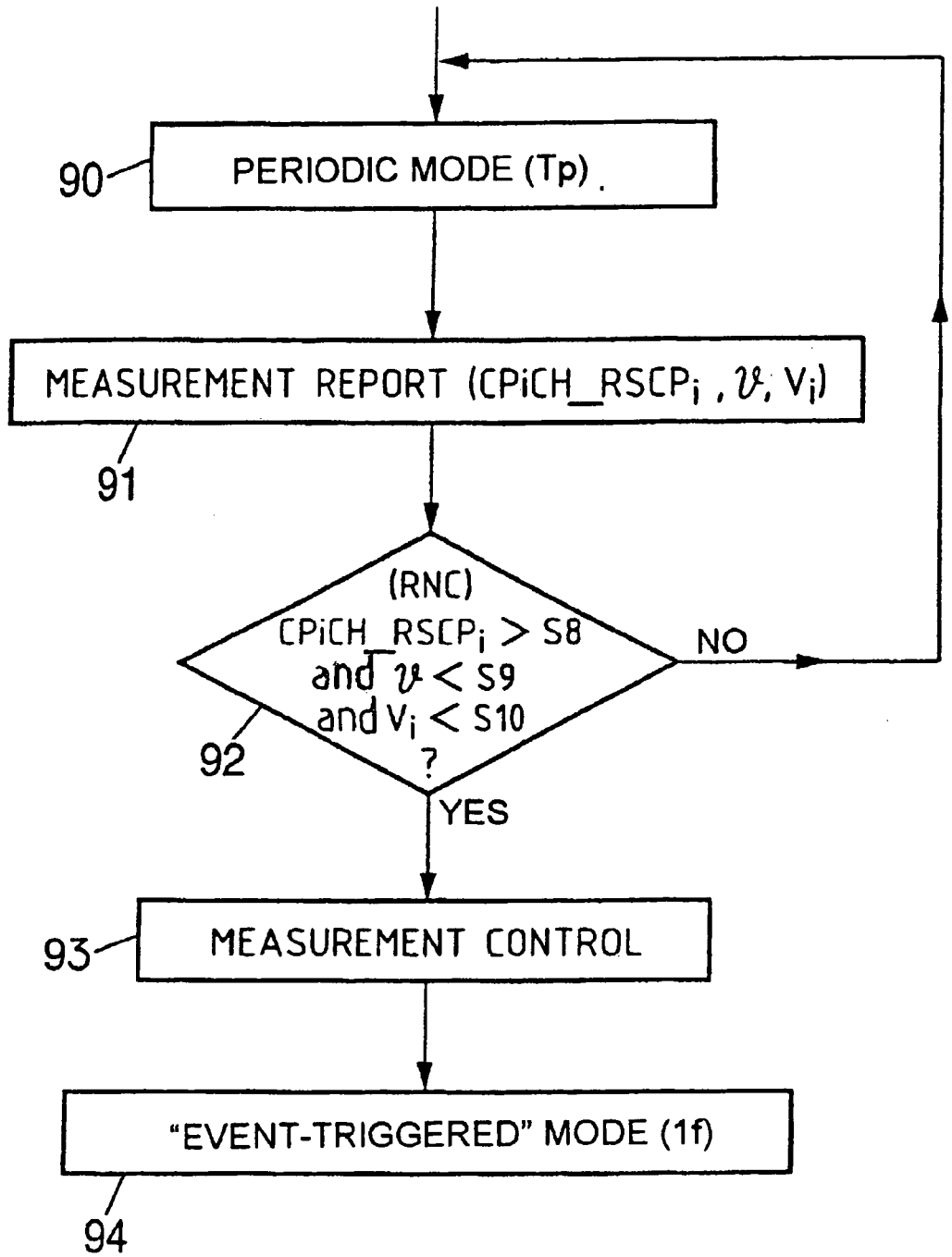

The example of FIG. 11, the UE 14 is initially in periodic mode, with a reporting period T$_p$ (step 90). Consequently, at each period T$_p$, the UE sends the RNC a "MEASUREMENT REPORT" message in which it indicates in particular the last parameters CPICH-RSCP$_i$, V$_i$ and V. In the analysis of these parameters, done in step 92, the RNC examines whether the signal level CPICH_RSCP$_i$ becomes at a threshold S8. If it does, it addresses a "MEASUREMENT CONTROL" message to the UE to cause it to go to event-based mode (step 93) only if the estimated speed of the UE is considered to be slow, that is to say less than a threshold S9 and if the channel between the UE and its serving cell is relatively rich in multipaths, this being expressed by the condition that the variance V$_i$ is less than a threshold S10. This threshold S10 may in particular be inversely proportional to an order of diversity corresponding to one or two propagation paths. Specifically, when the channel gives rise to little diversity, it may be risky to go to event-based mode, even if the UE is moving slowly and if the level received on the CPICH seems to be excellent (there is a risk of this resulting in a loss of communication if an obstacle suddenly causes the dominant propagation path to be lost). The "MEASUREMENT CONTROL" message sent to the UE when CPICH_RSCP$_i$>S8, V<S9 and V$_i$<S10 causes the UE to go to event-based mode in step 94, the event if being for example monitored subsequently.

As a variant, this "MEASUREMENT CONTROL" message of step 93 could maintain the UE in periodic reporting mode, but with a lengthened period relative to the period T$_p$.

As before, the example of FIG. 11 can comprise multiple variance. In particular, the variance test performed in step 92 may pertain to the variation in the variance rather than to its absolute value, an increasing variance giving rise to the maintaining of the periodic mode with the period Tp.

Yet many other variance may be implemented in the context of the invention to allow a transition, or on the contrary maintenance, in a given mode of transmission of the measurements (event-based mode or periodic mode), depending on the estimated speed V of the UE possibly in combination with the variance V$_i$ or the time dependence of this variance.

In particular, when the UE considered is in a macrodiversity situation, that is to say in simultaneous communication with several nodes B, the transitions between the measurements upload modes may take account of the respective measurements on the corresponding channels for each associated radio link. By way of example, it will be possible to go from the event-based mode of transmission to the periodic mode if the quantity CPICH_RSCP$_i$ is less than a threshold for at least one of the radio links between the UE and a node B of the active set and if the estimated speed of the UE is greater than a threshold. Conversely, it will be possible to go from the periodic mode of transmission to the event-based mode if the quantity CPICH_RSCP$_i$ is greater than a threshold for at least one of the radio links between the UE and a node B of the active set and if the estimated speed of the UE is less than a threshold.

In the case where the UE is in communication with certain nodes B, according to a given communication service (voice communication, data transmission, etc.), the determination of the reporting mode may also take account of the service in question. By way of example, if a voice communication is in progress between the UE and at least one node B, it is possible to favour the switchover or maintenance in periodic transmission mode, in a more sensitive way than in the case of a data transmission. The voice communication is in fact more sensitive to degradations of the radio conditions and therefore requires more frequent observation of this conditions.

For this purpose, it is possible to choose more severe thresholds for the various parameters estimated when radio degradations are poorly supported by the service. For example, in the example illustrated in FIG. 10, it is possible to choose a higher threshold S5 for a voice service than for a data service, so as to favour the switchover from the event-based mode to the periodic mode when the radio conditions degrade. Likewise, it is possible to use smaller thresholds of speed S6 and of temporal variability S7 for a voice service than for a data service. One thus favours the switchover from the event-based mode to the periodic mode, considering the speed of the UE to be high and/or the temporal variability to be high earlier.

In another embodiment of the invention, the control of the mode of reporting by the RNC, taking account of the information regarding the speed of movement of the mobile terminal, consists in adding or deleting parameters that are to form the subject of reports of measurements on the part of the UE or of the node B. This makes it possible for example to adopt distinct criteria for placing cells in or removing them from the active set, which are based on measurements of different parameters depending on whether the estimated speed is large or small.

The invention claimed is:

1. A method of controlling a mode of reporting of measurements made on a radio interface between a mobile terminal and a cellular radio network infrastructure, the infrastructure comprising at least one radio network controller and fixed transceivers, the method comprising the following steps:
measuring parameters of radio propagation between the mobile terminal and at least one of the fixed transceivers;
transmitting to the radio network controller report messages indicating at least a part of the measured parameters, in accordance with a mode of reporting specified by the radio network controller;
obtaining an estimate of speed of movement of the mobile terminal at the radio network controller; and
processing the report messages at the radio network controller so as to determine, by taking account of the said estimate of speed, a mode of reporting to be specified for a part at least of the report messages.

2. A method according to claim 1, in which the speed estimate is calculated on the basis of the radio propagation parameters measured, and is included in a report message so as to be obtained at the radio network controller.

3. A method according to claim 1, in which the determination of the mode of reporting comprises the selection between a periodic transmission of the report messages and a transmission of the report messages upon event detection.

4. A method according to claim 3, in which the periodic transmission of the report messages is favoured with respect to the transmission of the report messages upon event detection when the estimate of the speed of movement of the mobile terminal is greater than a threshold.

5. A method according to claim 3, in which
certain at least of the measured parameters indicated in the report messages for at least one fixed transceiver comprise data representative of a temporal variability of an energy level received over the channel between the mobile terminal and the said fixed transceiver;
the processing of the report messages to determine the report mode takes account moreover of the said data representative of the temporal variability; and
the periodic transmission of the report messages is favoured with respect to the transmission of the report messages upon event detection when the temporal variability of the energy level is greater than a threshold.

6. A method according to claim 3, in which
certain at least of the measured parameters indicated in the report messages for at least one fixed transceiver comprise data representative of a temporal variability of an energy level received over the channel between the mobile terminal and the said fixed transceiver;
the processing of the report messages to determine the report mode takes account moreover of the said data representative of the temporal variability; and
the periodic transmission of the report messages is favoured with respect to the transmission of the report messages upon event detection when the temporal variability of the energy level is increasing.

7. A method according to claim 1, in which the determination of the report mode comprises, in the case of a periodic transmission of the report messages, the selection of the period of transmission of the said messages.

8. A method according to claim 5, in which the period of transmission selected is a decreasing function of the estimate of the speed of movement of the mobile terminal.

9. A method according to claim 7, in which
certain at least of the measured parameters indicated in the report messages for at least one fixed transceiver comprise data representative of a temporal variability of an energy level received over the channel between the mobile terminal and the said fixed transceiver;
the processing of the report messages to determine the report mode takes account moreover of the said data representative of the temporal variability; and
the period of transmission selected is a decreasing function of the temporal variability of the energy level.

10. A method according to claim 1, in which the determination of the report mode comprises, in the case of a transmission of the report messages upon event detection, the selection of the event whose detection gives rise to the transmission of one of the said messages.

11. A method according to claim 10, in which the event selected has a probability of occurrence which is an increasing function of the estimate of the speed of movement of the mobile terminal.

12. A method according to claim 10, in which
certain at least of the measured parameters indicated in the report messages for at least one fixed transceiver comprise data representative of a temporal variability of an energy level received over the channel between the mobile terminal and the said fixed transceiver;

the processing of the report messages to determine the report mode takes account moreover of the said data representative of the temporal variability; and the event selected has a probability of occurrence which is an increasing function of the temporal variability of the energy level.

13. A method according to claim 1, in which certain at least of the measured parameters indicated in the report messages for at least one fixed transceiver comprise data representative of a temporal variability of an energy level received over the channel between the mobile terminal and the said fixed transceiver.

14. A method according to claim 13, in which the processing of the report messages to determine the report mode takes account moreover of the said data representative of the temporal variability.

15. A method according to claim 1, in which the measurement of the radio propagation parameters is at least in part performed in the mobile terminal, the report message comprising upgoing messages sent by the mobile terminal to the infrastructure of the network.

16. A method according to claim 1, in which the measurement of the radio propagation parameters is at least in part performed in one of the fixed transceivers, the report messages comprising messages sent by the said fixed transceiver to the radio network controller.

17. A method according to claim 1, in which the processing of the report messages to determine the report mode takes account moreover of a service whose scope encompasses a communication between the mobile terminal and at least one of the said fixed transceivers.

18. A radio network controller for a cellular radio network infrastructure, comprising:

means for receiving report messages indicating radio propagation parameters measured between a mobile terminal and at least one fixed transceiver of the infrastructure, the report messages being transmitted in accordance with a mode of reporting specified by the radio network controller;

means for obtaining an estimate of speed of movement of the mobile terminal; and means for processing the report messages so as to determine, by taking account of the said estimate of speed, a mode of reporting to be specified for a part at least of the report messages.

19. A radio network controller according to claim 18, in which the means for obtaining an estimate of speed of movement of the mobile terminal comprise means for calculating said speed estimate on the basis of the radio propagation parameters measured, and means for receiving a report message including said speed estimate.

20. A radio network controller according to claim 18, in which the means for processing the report messages so as to determine a mode of reporting comprise means for selecting between a periodic transmission of the report messages and a transmission of the report messages upon event detection.

21. A radio network controller according to claim 20, in which the means for selecting between a periodic transmission of the report messages and a transmission of the report messages upon event detection favour the periodic transmission of the report messages with respect to the transmission of the report messages upon event detection when the estimate of the speed of movement of the mobile terminal is greater than a threshold.

22. A radio network controller according to claim 20, in which certain at least of the measured parameters indicated in the report messages for at least one fixed transceiver comprise data representative of a temporal variability of an energy level received over the channel between the mobile terminal and the said fixed transceiver;

the means for processing the report messages to determine the report mode take account moreover of the said data representative of the temporal variability; and the means for selecting between a periodic transmission of the report messages and a transmission of the report messages upon event detection favour the periodic transmission of the report messages with respect to the transmission of the report messages upon event detection when the temporal variability of the energy level is greater than a threshold.

23. A radio network controller according to claim 20, in which certain at least of the measured parameters indicated in the report messages for at least one fixed transceiver comprise data representative of a temporal variability of an energy level received over the channel between the mobile terminal and the said fixed transceiver;

the means for processing the report messages to determine the report mode take account moreover of the said data representative of the temporal variability; and the means for selecting between a periodic transmission of the report messages and a transmission of the report messages upon event detection favour the periodic transmission of the report messages with respect to the transmission of the report messages upon event detection when the temporal variability of the energy level is increasing.

24. A radio network controller according to claim 18, in which the means for processing the report messages so as to determine a mode of reporting comprise, in the case of a periodic transmission of the report messages, means for selecting the period of transmission of the said messages.

25. A radio network controller according to claim 24, in which the period of transmission selected is a decreasing function of the estimate of the speed of movement of the mobile terminal.

26. A radio network controller according to claim 24, in which certain at least of the measured parameters indicated in the report messages for at least one fixed transceiver comprise data representative of a temporal variability of an energy level received over the channel between the mobile terminal and the said fixed transceiver;

the means for processing the report messages to determine the report mode take account moreover of the said data representative of the temporal variability; and the period of transmission selected is a decreasing function of the temporal variability of the energy level.

27. A radio network controller according to claim 18, in which the means for processing the report messages so as to determine a mode of reporting comprise, in the case of a transmission of the report messages upon event detection, means for selecting the event whose detection gives rise to the transmission of one of the said messages.

28. A radio network controller according to claim 27, in which the event selected has a probability of occurrence which is an increasing function of the estimate of the speed of movement of the mobile terminal.

29. A radio network controller according to claim 27, in which
   certain at least of the measured parameters indicated in the report messages for at least one fixed transceiver comprise data representative of a temporal variability of an energy level received over the channel between the mobile terminal and the said fixed transceiver;
   the means for processing the report messages to determine the report mode take account moreover of the said data representative of the temporal variability; and
   the event selected has a probability of occurrence which is an increasing function of the temporal variability of the energy level.

30. A radio network controller according to claim 18, in which certain at least of the measured parameters indicated in the report messages for at least one fixed transceiver comprise data representative of a temporal variability of an energy level received over the channel between the mobile terminal and the said fixed transceiver.

31. A radio network controller according to claim 30, in which the means for processing the report messages to determine the report mode take account moreover of the said data representative of the temporal variability.

32. A radio network controller according to claim 18, in which the measurement of the radio propagation parameters is at least in part performed in the mobile terminal, the report message comprising upgoing messages sent by the mobile terminal to the infrastructure of the network.

33. A radio network controller according to claim 18, in which the measurement of the radio propagation parameters is at least in part performed in one of the fixed transceivers, the report messages comprising messages sent by the said fixed transceiver to the radio network controller.

34. A radio network controller according to claim 18, in which the means for processing the report messages to determine the report mode take account moreover of a service whose scope encompasses a communication between the mobile terminal and at least one of the said fixed transceivers.

* * * * *